(12) United States Patent
Johnson

(10) Patent No.: US 6,629,206 B1
(45) Date of Patent: Sep. 30, 2003

(54) SET-ASSOCIATIVE CACHE-MANAGEMENT USING PARALLEL READS AND SERIAL READS INITIATED DURING A WAIT STATE

(75) Inventor: Mark W. Johnson, Elgin, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/476,031

(22) Filed: Dec. 31, 1999

(51) Int. Cl.$^7$ .............................................. G06F 12/08
(52) U.S. Cl. ...................... 711/123; 711/120; 711/131; 711/145; 711/144
(58) Field of Search .................................. 711/118, 119, 711/123, 120, 144, 145, 150, 168, 125, 126, 129, 131

(56) References Cited

U.S. PATENT DOCUMENTS

| | | | | |
|---|---|---|---|---|
| 5,265,236 A | * | 11/1993 | Mehring et al. | 711/203 |
| 5,353,424 A | * | 10/1994 | Partovi et al. | 711/128 |
| 5,509,119 A | * | 4/1996 | Fetra | 714/52 |
| 5,860,097 A | * | 1/1999 | Johnson et al. | 711/128 |
| 5,920,888 A | | 7/1999 | Shirotori et al. | |
| 6,084,871 A | * | 6/2000 | Hwangbo | 711/118 |

FOREIGN PATENT DOCUMENTS

GB      2 297 398 A      7/1996

* cited by examiner

Primary Examiner—B. James Peikari
(74) Attorney, Agent, or Firm—Peter Zawilski

(57) ABSTRACT

A Harvard-architecture computer system includes a processor, an instruction cache, a data cache, and a write buffer. The caches are both set-associative in that they each have plural memories; both caches perform parallel reads by default. In a parallel read, all cache-memory locations of the selected cache corresponding to the set ID and word position bits of a requested read address are accessed in parallel while it is determined whether or not one of these locations has a tag matching the tag portion of the requested read address. If there is a "hit" (match), then an output multiplexer selects the appropriate cache memory for providing its data to the processor. The parallel read thus achieves faster reads, but expends extra power in accessing non-matching sets. A cache receiving a read request while the processor is waited performs a serial read instead of a parallel read. In a serial read, the tag match is performed before the data is accessed. Accordingly, a cache memory is accessed only if a match is found, achieving a power savings relative to a parallel read. There is no latency penalty since the parallel read cannot be completed during the wait. Thus, the power savings is achieved without impairing performance.

15 Claims, 3 Drawing Sheets

United States Patent US 6,629,206 B1

SET-ASSOCIATIVE CACHE-MANAGEMENT USING PARALLEL READS AND SERIAL READS INITIATED DURING A WAIT STATE

BACKGROUND OF THE INVENTION

The present invention relates to computers and, more particularly, to a method for managing a set-associative cache. A major objective of the present invention is to reduce the average power consumed during read operations in a set-associative cache that employs parallel reads.

Much of modern progress is associated with the increasing prevalence of computers. In a conventional computer architecture, a data processor manipulates data in accordance with program instructions. The data and instructions are read from, written to, and stored in the computer's "main" memory. Typically, main memory is in the form of random-access memory (RAM) modules.

A processor accesses main memory by asserting an address associated with a memory location. For example, a 32-bit address can select any one of up to $2^{32}$ address locations. In this example, each location holds eight bits, i.e., one "byte" of data, arranged in "words" of four bytes each, arranged in "lines" of four words each. In all, there are $2^{30}$ word locations, and $2^{28}$ line locations.

Accessing main memory tends to be much faster than accessing disk and tape-based memories; nonetheless, main-memory accesses can leave a processor idling while it waits for a request to be fulfilled. To minimize such latencies, a cache can intercept processor requests to main memory and attempt to fulfill them faster than main memory can.

To fulfill processor requests to main memory, caches must contain copies of data stored in main memory. In part to optimize access times, a cache is typically much less capacious than main memory. Accordingly, it can represent only a small fraction of main-memory contents at any given time. To optimize the performance gain achievable by a cache, this small fraction must be selected strategically.

In the event of a cache "miss", i.e., when a request cannot be fulfilled by a cache, the cache fetches an entire line of main memory including the memory location requested by the processor. Addresses near a requested address are more likely than average to be requested in the near future. By fetching and storing an entire line, the cache acquires not only the contents of the requested main-memory location, but also the contents of the main-memory locations that are relatively likely to be requested in the near future.

Where the fetched line is stored within the cache depends on the cache type. A fully-associative cache can store the fetched line in any cache-storage location. Typically, any location not containing valid data is given priority as a target storage location for a fetched line. If all cache locations have valid data, the location with the data least likely to be requested in the near term can be selected as the target storage location. For example, the fetched line might be stored in the location with the least recently used data.

The fully-associative cache stores not only the data in the line, but also stores the line-address (the most-significant 28 bits) of the address as a "tag" in association with the line of data. The next time the processor asserts a main-memory address, the cache compares that address with all the tags stored in the cache. If a match is found, the requested data is provided to the processor from the cache.

In a fully-associative cache, every cache-memory location must be checked for a tag match. Such an exhaustive match checking process can be time consuming, making it hard to achieve the access speed gains desired of a cache. Another problem with a fully-associative cache is that the tags consume a relatively large percentage of cache capacity, which is limited to ensure high-speed accesses.

In a direct-mapped cache, each cache storage location is given an index that, for example, might correspond to the least-significant line-address bits. For example, in the 32-bit address example, a six-bit index might correspond to address bits 23–28. A restriction is imposed that a line fetched from main memory can only be stored at the cache location with an index that matches bits 23–28 of the requested address. Since those six bits are known, only the first 22 bits are needed as a tag. Thus, less cache capacity is devoted to tags. Also, when the processor asserts an address, only one cache location (the one with an index matching the corresponding bits of the address asserted by the processor) needs to be examined to determine whether or not the request can be fulfilled from the cache.

In a direct-mapped cache, a line fetched in response to a cache miss must be stored at the one location having an index matching the index portion of the read address. Previously written data at that location is overwritten. If the overwritten data is subsequently requested, it must be fetched from main memory. Thus, a directed-mapped cache can force the overwriting of data that may be likely to be requested in the near future. The lack of flexibility in choosing the data to be overwritten limits the effectiveness of a direct-mapped cache.

A set-associative cache is divided into two or more direct-mapped memories. A set identification value ("set ID"), corresponding to an index for the direct-mapped cache, is associated with one memory location in each set. Thus, in a four-way set associative cache, there are four cache locations with the same set ID, and thus, four choices of locations to overwrite when a line is stored in the cache. This allows more optimal replacement strategies than are available for direct-mapped caches. Still, the number of locations that must be checked, e.g., one per memory, to determine whether a requested location is represented in the cache is quite limited. Also, the number of bits that need to be compared is reduced by the length of the set ID. Thus, set-associative caches combine some of the replacement strategy flexibility of a fully-associative cache with much of the speed advantage of a direct-mapped cache.

The portion of an asserted address corresponding to the set ID identifies one cache-line location within each cache memory. The tag portion of the asserted address can be compared with the tags at the identified cache-memory line locations to determine whether there is a hit (i.e., tag match) and, if so, in which cache memory the hit occurs. If there is a hit, the least-significant address bits are checked for the requested location within the line; the data at that location is then provided to the processor to fulfill the read request.

A read operation can be hastened by starting the data access before a tag match is determined. While checking the relevant tags for a match, the data locations with the proper set ID within each cache memory are accessed in parallel. By the time a match is determined, data from all four memories are ready for transmission. The match is used, e.g., as the control input to a multiplexer, to select the data actually transmitted. If there is no match, none of the data is transmitted.

The parallel-read operation is much faster since the data is accessed at the same time as the match operation is conducted rather than after. For example, a parallel "tagand-data" read operation might consume only one memory cycle, while a serial "tag-then-data" read operation might require two cycles. Alternatively, if the serial read operation consumes only one cycle, the parallel read operation permits a shorter cycle, allowing for more processor operations per unit of time.

The gains of the parallel tag-and-data reads are not without some cost. The data accesses to the sets that do not provide the requested data consume additional power that can tax power sources and dissipate extra heat. The heat can fatigue, impair, and damage the incorporating integrated circuit and proximal components. Accordingly, larger batteries or power supplies and more substantial heat removal provisions may be required. What is needed is a cache-management method that achieves the speed advantages of parallel reads but with reduced power consumption.

SUMMARY OF THE INVENTION

In a context in which parallel reads are performed by default to achieve a performance advantage, the present invention provides for initiating a serial tag-match-then-access read during a wait state. The tag-match is performed during the wait. When the wait is released, the data to be read can be accessed as determined by the tag-match operation. Further tag-then-access reads can be performed in a pipelined fashion.

For at least some processors, the assertion of a wait does not preclude the processor from requesting data. Instead, the wait prevents the processor from recognizing a clock transition that would indicate when the requested read data is valid. The read request cannot be fulfilled while the wait is asserted. However, the tag matching can be performed. By the time the wait is released, the tag match is completed. The tag match data is thus available by the time the data is needed by the processor. Accordingly, only a cache memory having the requested data needs to be accessed. The other cache memories do not need to be accessed. Thus, the power associated with those superfluous accesses can be saved.

For example, consider the case in which a parallel read consumes one system cycle and a serial read consumes two cycles—the first of which is devoted to the tag-match operation, and the second is devoted to accessing the data as indicated by the tag match. If a wait is asserted for one cycle, a parallel read cannot be implemented until the cycle following the wait. In the case of a serial read, the tag-match can be completed during the wait. In either case, (assuming a cache hit) the read is fulfilled in the second cycle.

Many caches do not provide for initiating a read operation while they are asserting a wait. However, many computer systems have multiple devices that can cause a wait to be asserted. For example, in a Harvard architecture, there can be separate data and iuction caches. A suitable processor can issue a read to one cache while waited due to an incomplete operation involving the other cache. Thus, the power savings afforded by the invention can be especially significant in Harvard and other architectes in which there are multiple devices that can be the cause of a wait being asserted.

The present invention provides for power savings without impairing performance. A parallel read initiated during a wait cannot be completed until the wait is removed. Thus, while a wait is asserted, there is no latency advantage to asserting a parallel read instead of a serial read. Therefore, in such a circumstance, the power savings associated with a serial tag-match-then-access read is achieved without a performance penalty. Further power savings can be achieved by pipelining subsequent read operations. These and other features and advantages are apparent from the description below with reference to the following drawings.

DESCRIPTION OF THE PREFERRED EMBODIMENTS

Figure 1:
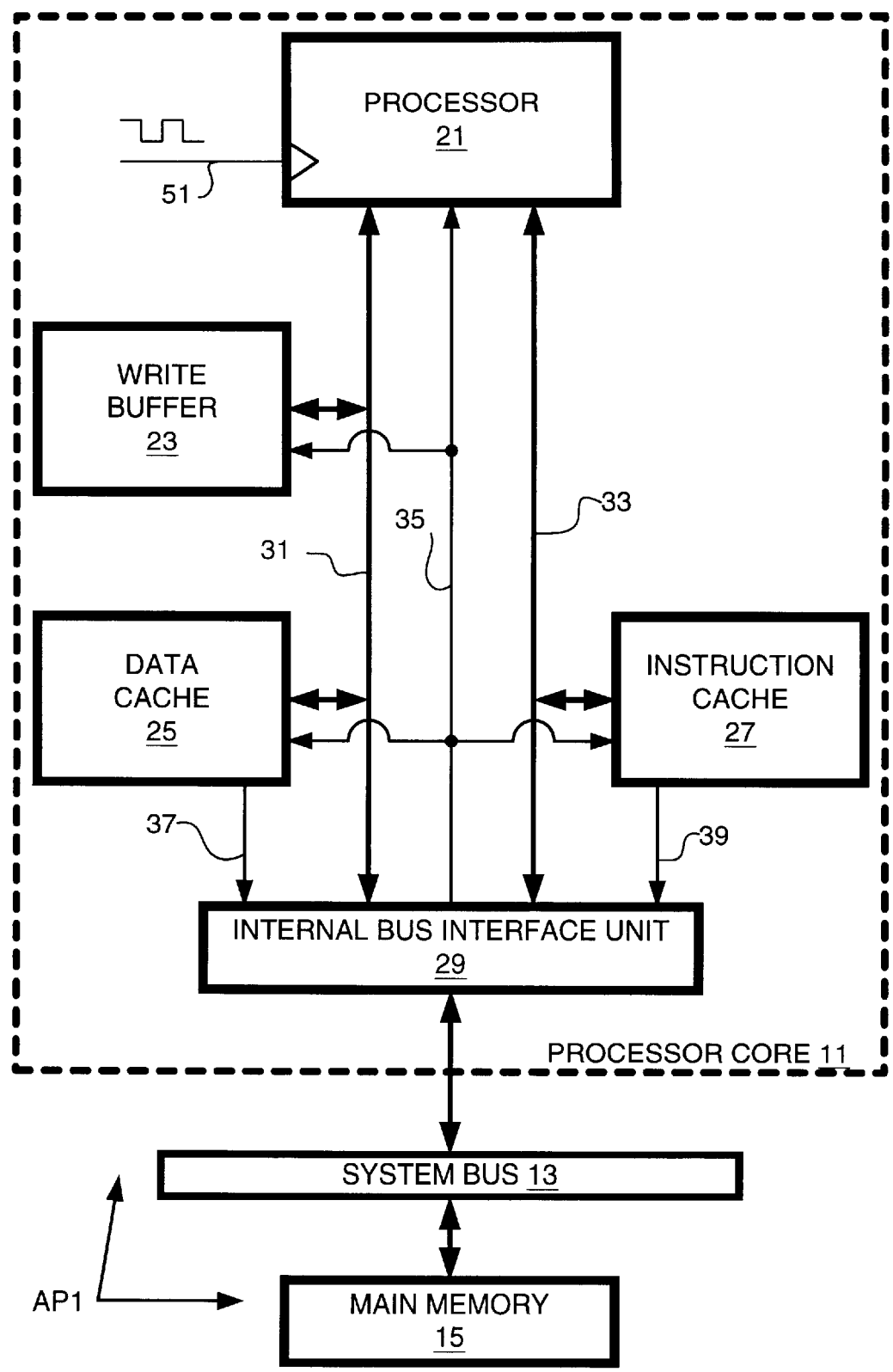
FIG. 1 is a block diagram of a computer system employing the method of the invention.

A Harvard-architecture computer system AP1 comprises a processor core 11, a system bus 13, and main memory 15, as shown in FIG. 1. Processor core 11 includes a data processor 21, a write buffer 23, a data cache 25, a insection cache 27, and an internal-bus interface unit 29. Harvard-architecture processor 21, an Arm 9 (manufactured by VLSI Technology, Inc.), supports both a data bus 31 and an instruction bus 33. Data bus 31 couples processor 21, write buffer 23, data cache 25, and interface 29. Instruction bus 33 couples processor 21, instrction cache 27, and interface 29. Interface 29 can issue a "wait" signal along lines 35 that can be received by processor 21, write buffer 23, data cache 25, and instruction cache 27. Data cache 25 can issue a "hit" indication to interface 29 via line 37; instruction cache 27 can issue a "hit" indication to interface 29 via line 39.

Figure 2:
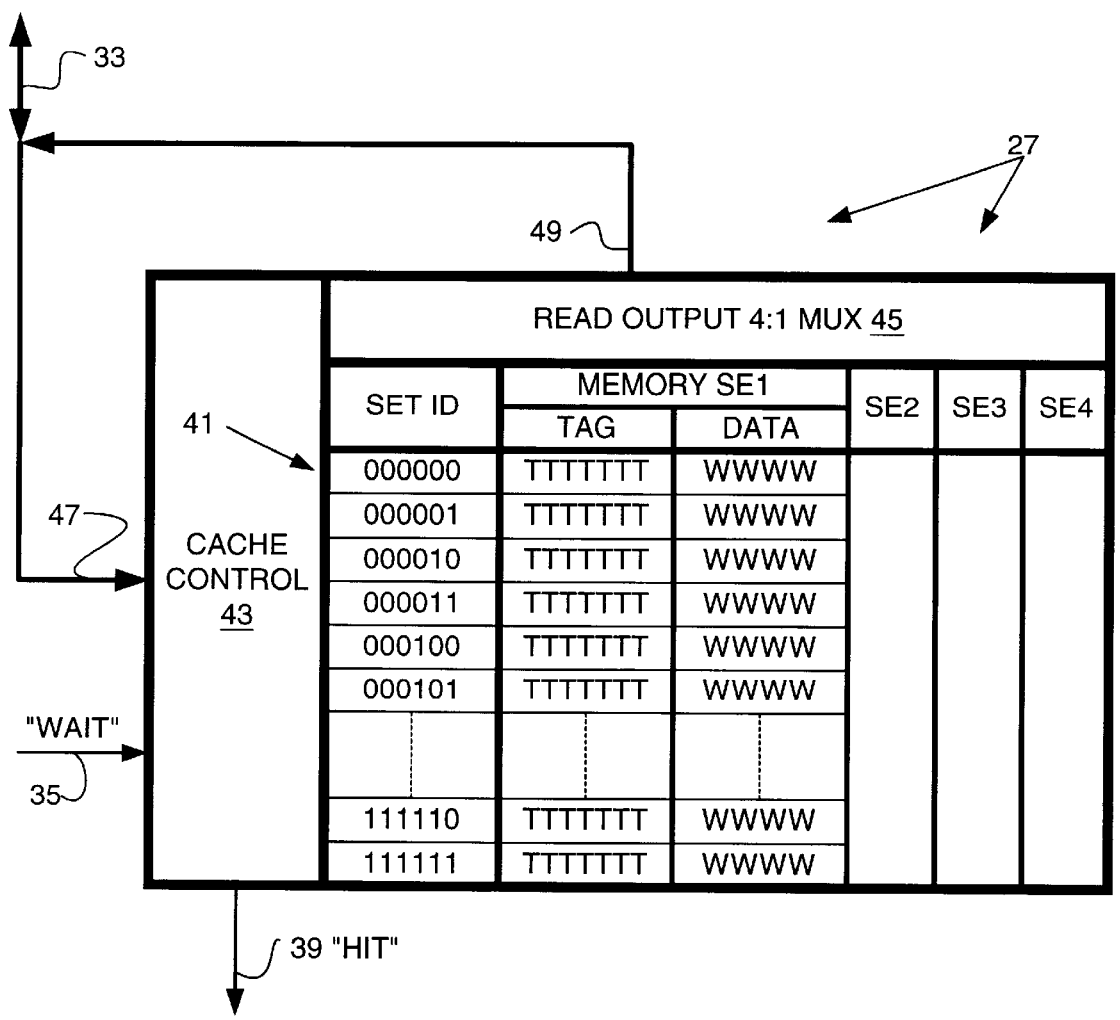
FIG. 2 is a block diagram of an instruction cache of the system of FIG. 1.

Four-way set-associative instruction cache 27 comprises cache memories 41, a cache controller 43, and a 4:1 output multiplexer 45, as shown in FIG. 2. Cache memories 41 include four memories SE1, SE2, SE3, and SE4. Each cache memory has sixty-four cache-line locations. Each cache-line location of each memory has a corresponding six-bit set ID. Each six-bit set ID thus corresponds to four cache-line locations. Each cache-line location stores a line of four 32-bit words and a 22-bit tag. The four 32-bit words are a copy of the four 32-bit words stored in main memory at a line location corresponding to an address that is the concatenation of the tag and the set ID associated with the cache-line location at which that tag is stored.

Data cache 25 is a read-write cache, but is otherwise functionally similar to instruction cache 27. Data-write operations are directed to both main memory 15 and to data cache 25. The writes to main memory are buffered by write buffer 23, which is four write-requests deep. The operation of cache 25 is otherwise apparent from the detailed description of the operation of cache 27 below with reference to FIG. 2.

By default, when it receives a read request along the control and address lines 47 of instruction bus 33, instruction cache 27 implements a parallel-read operation. Cache controller 43 compares the four tags stored at the four cache-line locations having a set ID matching the 23–28$^{th}$ most-significant bits of the read address. Concurrently, cache controller 43 accesses the four cache-line locations so that the data stored at the requested word location within the line is provided to the four inputs of output multiplexer 45. In the event that the tag-match operation indicates a hit, the input of multiplexer 45 corresponding to the cache memory in which the match was found is selected to provide the requested data to processor 21 via the data lines 49 of instruction bus 33. The hit is indicated to interface 29 so that the read request is not forwarded to main memory 15.

In the event of a cache miss, instruction cache 27 does not couple any of the cache memories SE1–SE4 to instruction bus 33. Also, instruction cache 27 does not indicate a hit to interface 29. Accordingly, interface 29 forwards the read request to main memory 15 via system bus 13. An entire line of instructions is fetched from main memory 15 and stored at an appropriate location of instruction cache 27. The requested instruction is forwarded to processor 21.

In system AP1, a read from main memory can consume ten to twenty system bus cycles. During this read operation, the system bus cannot handle another request. Accordingly, interface 29 issues a "wait" command to processor 21 until the read request is fulfilled.

The effect of the wait command is to gate a system clock signal as received by processor 21 along line 51 (FIG. 1). The system-clock signal has two phases, a first phase in which it is high and a second phase in which it is low. The wait signal transitions only during the second phase. When it is asserted, the system clock signal as received by processor 21 does not undergo a positive transition normally associate with the first phase of the next clock signal. Processor 21 waits for the next upward clock transition to indicate when requested instruction is available.

Interface 29 issues "wait" commands not only in the event of an instruction-cache miss, but also in the event of a data-cache miss, and in the event of a write operation. If processor 21 does not need the results of a first read request first, it can issue a second read request even while it is waited. However, this read request cannot be fulfilled until the wait signal associated with the first read is released.

If an instruction read request is made while processor 21 is waited due to a previous data-read miss, instruction cache 27 can still receive the request. Since the request is received, the tag-matching can be implemented. Since processor 21 cannot receive the results of the instruction read request, there is no advantage to placing the requested instruction on instruction bus 33 immediately. Accordingly, the data access can be delayed until the wait is released. Since the tag match is completed, either only one cache memory (in the case of a hit) or no cache memory (in the case of a miss) needs to be accessed. The power required is only that for a serial tag-match, yet, from the perspective of processor 21, there is no delay in obtaining the results from the instruction read request relative to what would be achievable using a parallel read.

Of course, it does not really matter why the wait was asserted. A power savings can be achieved by initiating a serial read instead of a parallel read in the event a wait is asserted, for examples, due to a write operation, or to a read miss by the other cache. In systems where other devices can assert wait signals, the caches can similarly take advantage of the power-savings of the serial tag-match-then-access read.

Figure 3:
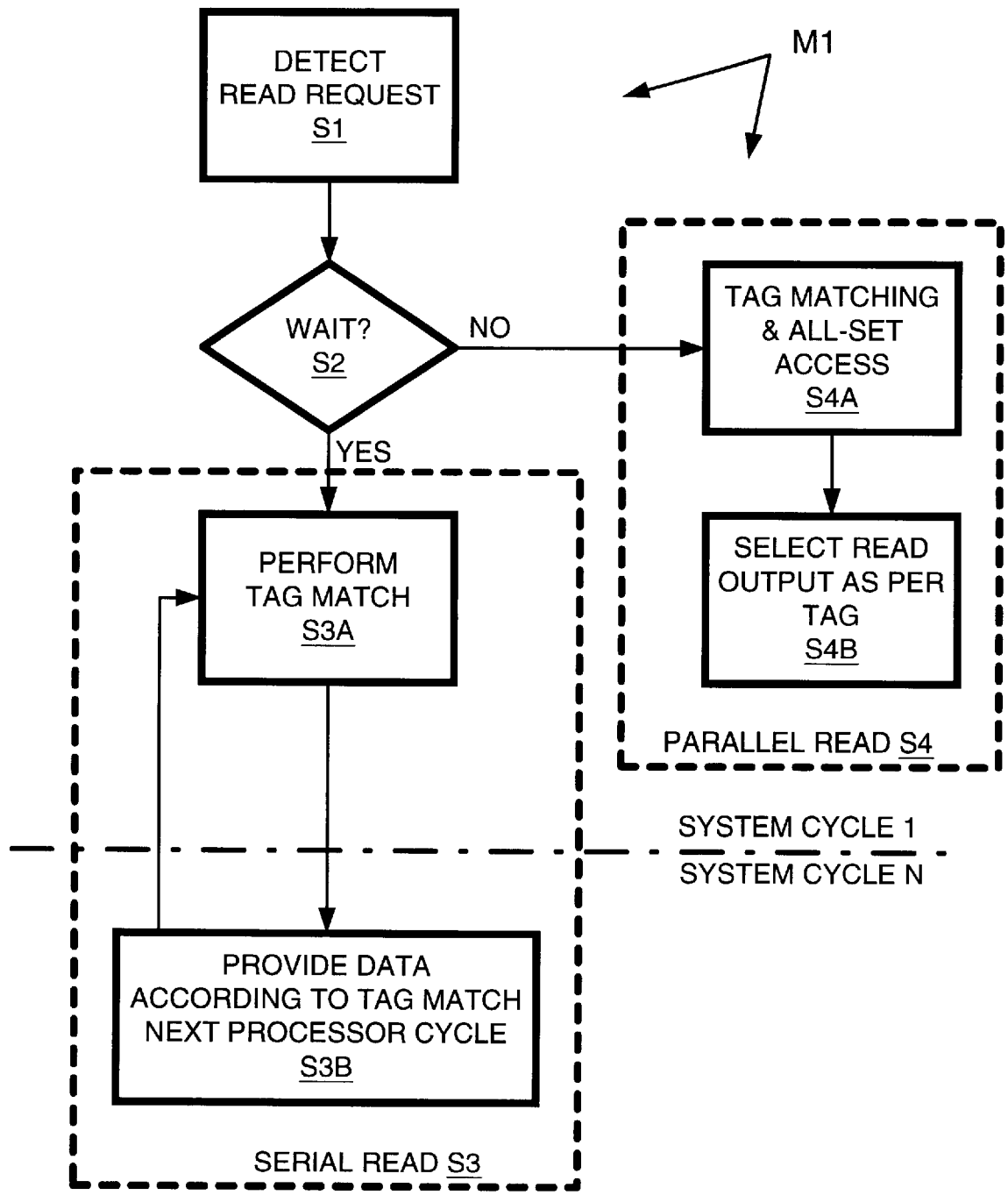
FIG. 3 is a flow chart of the method of the invention as implemented in the computer system of FIG. 1.

A method M1 of the invention as implemented by caches 25 and 27 of system AP1 is flow charted in FIG. 3. A read request is detected at step S1. A determination of whether a "wait" is asserted is made at step S2. If a wait is asserted, serial read is performed at step S3. The serial read involves two substeps: 1) a tag match is performed at step S3A; and 2) then data is accessed and provided to processor 21 at step S3B. Substeps S3A and S3B are performed during different system-clock cycles. In the event of a hit, only the cache memory having the match is accessed. In the event of a miss, no cache memories are accessed, but main memory 15 is accessed.

If at step S2, it is determined that a wait is not asserted, a parallel read is performed at step S4. Parallel read step S4 involves two substeps: 1) tag-matching and accessing all cache memories at substep S4A; and 2) selecting a multiplexer input (or no input) at substep S4B. In the event of a hit, step S4 is completed in one system-clock cycle so that the data can be read at the beginning of the next cycle.

The invention provides for cases in which a serial read is performed even when a wait is not asserted. For example, if a read is requested while a prior read is being fulfilled from a cache, the latter read can be pipelined. The tag-match for the latter read can be performed during the same cycle that the prior read data is being transferred to the processor. In addition, a serial read can follow a write operation without costing any processor clock cycles. Furthermore, the invention is compatible with other methods for saving power during read requests; such methods include determining whether a current address is from the same line as the previous address and, if so, omitting the superfluous tag-match operation. These and other variations upon and modifications to the described embodiments are provided for by the present invention, the scope of which is defined by the following claims. In the claims, words introduced in quotes are labels and not words of limitation.

What is claimed is:

1. A cache-management method for managing a set-associative cache with plural cache memories, said method comprising the steps of:

in response to a read request issued while a wait is asserted,
performing a serial tag-match operation using at least one cache memory, and
once said wait is released, accessing at most one of the memories of said cache for providing data responsive to the serial tag-match operation; and in response to a read request issued while a wait is not asserted,
concurrently accessing a plurality of the cache memories while performing an parallel tag-match operation using the plurality of cache memories, and
selecting at most one of said cache memories for providing data responsive to the parallel tag-match operation.

2. A method as recited in claim 1 wherein exactly one of said cache memories is accessed after said wait is released when said serial tag-match operation results in a hit.

3. A method as recited in claim 1 wherein none of said cache memories is accessed after said wait is released when said serial tag-match operation results in a miss.

4. A method as recited in claim 1 wherein data is provided from exactly one of said cache memories when said parallel tag-match operation results in a hit.

5. A method as recited in claim 1 wherein data is not provided from any of the cache memories when said parallel tag-match operation results in a miss.

6. A method as recited in claim 1 wherein said steps performed in response to said read request issued while a wait is asserted collectively consume more system clock cycles than are collectively consumed by said steps performed in response to said read request issued while a wait is not asserted.

7. A method as recited in claim 1, wherein the data is provided to a processor.

8. A set-associative cache comprising:
plural cache memories;
a cache control;
wherein
in response to a read request issued while a wait is asserted,
the cache control performs a serial tag-match operation using at least one cache memory, and once said wait is released, the memory control enables access at most one of the memories of said cache for providing data responsive to the serial tag-match operation, and in response to a read request issued while a wait is not asserted, the cache control enables concurrently accessing a plurality of the cache memories while performing a parallel tag-match operation using the plurality of cache memories, and the cache control enables selecting one of said cache memories for providing data responsive to the parallel tag-match operation.

9. A set-associative cache as recited in claim 8 wherein exactly one of said cache memories is accessed after said wait is released when said serial tag-match operation results in a hit.

10. A set-associative cache as recited in claim 8 wherein none of said cache memories is accessed after said wait is released when said serial tag-match operation results in a miss.

11. A set-associative cache as recited in claim 8 wherein data is provided from exactly one of said cache memories when said parallel tag-match operation results in a hit.

12. A set-associative cache as recited in claim 8 wherein data is not provided from any of the cache memories when said parallel tag-match operation results in a miss.

13. A set-associative cache as recited in claim 8 wherein said steps performed in response to said read request issued while a wait is asserted collectively consume more system clock cycles than are collectively consumed by said steps performed in response to said read request issued while a wait is not asserted.

14. A set-associative cache as recited in claim 8, wherein the data is provided to a processor.

15. A system comprising:

a processor;

a main memory; and a set-associative cache memory comprising:

plural cache memories;

a cache control;

wherein in response to a read request from the processor issued while a wait is asserted, the cache control performs a serial tag-match operation using at least one cache memory, and once said wait is released, the memory control enables access at most one of the memories of said cache for providing data responsive to the serial tag-match operation; and in response to a read request issued from the processor while a wait is not asserted, the cache control enables concurrently accessing a plurality of the cache memories while performing a parallel tag-match operation using the plurality of cache memories, and the cache control enables selecting one of said cache memories for providing data responsive to the parallel tag-match operation.

\* \* \* \* \*